Aug. 16, 1955     S. OXHANDLER     2,715,270
LOCKING MEANS FOR PRUNING SHEARS OR THE LIKE
Filed Oct. 29, 1952
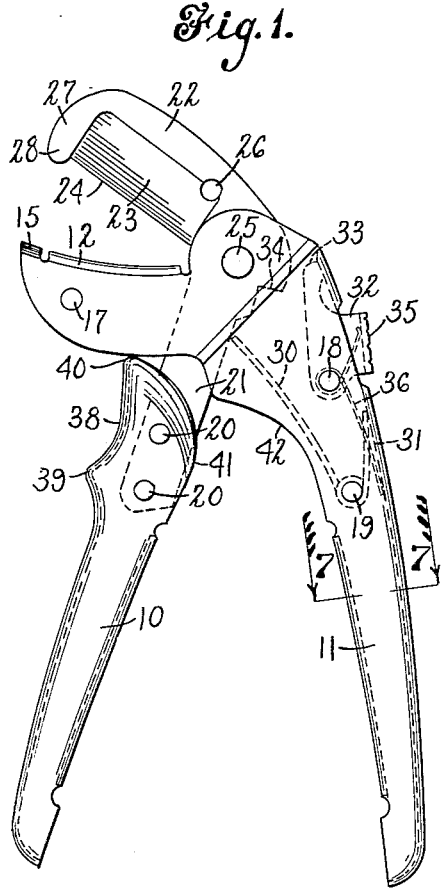
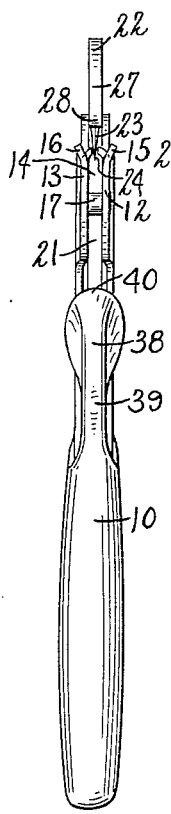
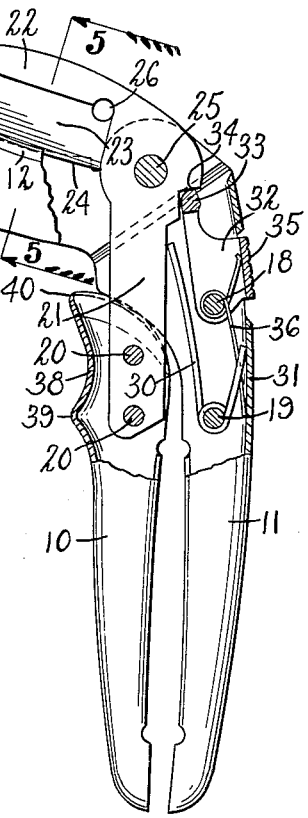
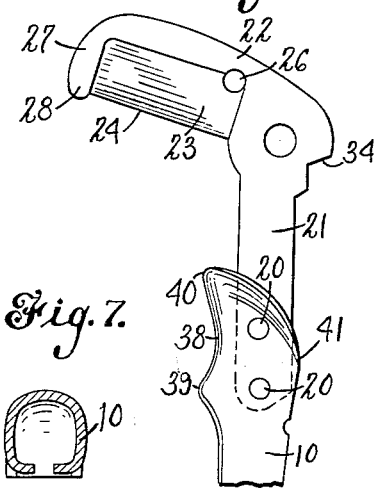
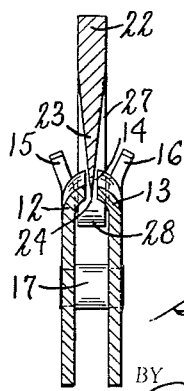
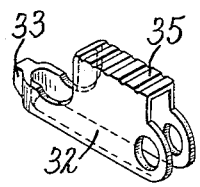
INVENTOR
Samuel Oxhandler
BY Rockwell Bartholow
ATTORNEYS

United States Patent Office 2,715,270
Patented Aug. 16, 1955

2,715,270

LOCKING MEANS FOR PRUNING SHEARS OR THE LIKE

Samuel Oxhandler, North Haven, Conn., assignor to Sargent & Company, New Haven, Conn., a corporation of Connecticut Application October 29, 1952, Serial No. 317,485

2 Claims. (Cl. 30—262)

This invention relates to hand tools and more particularly to a device of this character for use as a pruning shear.

In the usual form of a tool of this kind the tool comprises a pair of pivoted handle members, each having a cutting member secured thereto, which members are opened and closed upon movement of the handles about their pivots, the cooperating cutting members being either formed integrally with or secured rigidly to the handle portions. In the present instance a cutting blade is secured to one handle portion and the other carries an anvil member which cooperates with the blade to perform the shearing operation. The anvil consists of a pair of spaced members between which the blade is adapted to enter in the cutting operation, these members acting as shear members to cooperate with the blade and effect a sharp and clean cut.

Also in the present tool means are provided for guiding the blade between the shear members of the anvil so that it will not contact these members in use and become dulled. Also, means are provided for limiting the closed position of the handle members and thus limiting the movement of the blade within the space between the two anvil members.

It is also desirable in a tool of this kind to provide means for holding the jaws of the tool in closed position, and it is desirable that this means be so formed that it may be conveniently moved to its operative position, and preferably as in the present instance moved automatically by a spring or like means to its inoperative position.

I have also provided in the present device means to limit the size of a branch or other piece of material which may be offered to the jaws of the tool so that no branch which would ordinarily be too large to cut by the tool may be inserted between the jaws.

One object of the present invention is to provide a pruning shear which will be more efficient in operation than devices of this kind presently available upon the market.

A further object of the invention is to provide a pruning shear having a new and improved locking means to lock the cooperating cutting members of the shear in closed position.

Still another object of the invention is to provide a pruning shear having a cutting blade and spaced cooperating shearing members between which the blade is adapted to enter and means to guide the blade into the space between the shearing members.

Still another object of the invention is to provide a pruning shear having an improved hand grip so that it may be readily held in the hand of the user during operation even though a considerable force is necessary to operate the tool.

Still another object of the invention is to provide a pruning shear and cooperating cutting or shearing members with means for limiting the size of the mouth of the opening between these members.

To these and other ends the invention consists in the novel features and combinations of parts to be hereinafter described and claimed.

In the accompanying drawings:

Fig. 1 is a side elevational view of the shears embodying my invention showing the jaws in open position;

Fig. 2 is a front elevational view of the shears;

Fig. 3 is a view similar to Fig. 1 showing the jaws in closed position and some parts being broken away to show the interior structure;

Fig. 4 is a detail view of the cutting blade;

Fig. 5 is a sectional view on line 5—5 of Fig. 3;

Fig. 6 is a detail view of the locking member; and

Fig. 7 is a sectional view on line 7—7 of Fig. 1.

To illustrate a preferred embodiment of my invention, I have shown in the drawings pruning shears comprising a pair of hollow handle members 10 and 11, these members being conveniently formed of sheet metal so that they present a rounded outer surface to provide a convenient grip and at the same time are of relatively light weight.

The side walls of the handle member 11 at the upper end of the latter are flattened and pressed together to provide a pair of spaced shear or anvil members 12 and 13, these members, as shown more especially in Fig. 5, being displaced inwardly at their upper edges so as to provide between them a relatively narrow space 14. This space, as will be explained hereafter, is adapted to receive the cutting blade, and the opposing inner edges of these members on each side of the space 14 act as shear members to cooperate with the blade and perform the shearing operation.

At their outer or forward ends each of the members 12 and 13 is displaced outwardly so as to provide outwardly diverging lugs 15 and 16, these lugs, as will be hereinafter explained, serving as guide members to guide the blade into the space or opening 14 between the shear members. These lugs stand upwardly to a slight extent from the general level of the upper surfaces of the shear members 12 and 13 and serve to limit the opening between the cutting members.

The members 12 and 13 may be secured together by the rivet 17 and the walls of the handle member 11 may be similarly secured by the rivets 18 and 19, which latter rivets also serve to support certain of the mechanism of the shears, as will be hereinafter explained.

Secured to the upper portion of the handle member 10 by rivets 20 is a shank 21 shaped to form a blade head 22, the lower portion of which is sharpened at both edges, as shown more especially in Fig. 5, to provide a cutting blade 23 having a sharp lower edge 24 designed to enter the space 14 between the shear members 12 and 13. At approximately the junction of the shank 21 and head 22 this member is pivoted by the pivot pin 25 to the members 12 and 13 of the handle 11. This provides the pivotal connection between the handles about which the cooperating cutting members move.

The blade head 22 may be provided with an opening 26 by which the tool may be suspended from a hook or nail when not in use. At its forward edge the head is provided with a portion 27 relatively thick as compared to the thickness of the blade, this portion extending downwardly to provide a lug 28 projecting beyond the edge of the blade and cooperating with the lugs 15 and 16 to limit the opening between the blade and the shear members at each side of the space 14 so as to limit the size of a branch or other material which may be inserted between the shearing members.

A spring 30 is coiled about the rivet 19 (Fig. 3), one end of the spring acting against the shank 21 of the blade head and the other end acting against the web 31 of the handle member 11, the spring being tensioned to maintain the handles in open position, as shown in Fig. 1.

In order to lock the handles in closed position a locking member 32 of U-shaped form in cross section (Figs. 3 and 6) is pivoted on the rivet 18. This member is provided at its upper end with a locking dog 33 designed to engage below a shoulder 34 provided on the blade head 22, as shown in Fig. 3. When the parts are in this position the engagement of the dog 33 with the shoulder 34 will prevent the opening of the handle members by the spring 30.

The locking member 32 is provided with a web portion having a roughened surface 35 which projects through an opening in the handle 11 so that it may be engaged by the thumb of the operator so as to move the locking member to its operative position. It will be seen that pressure of the thumb on the member 35 above the pivot 18 will result in moving this member in a counterclockwise direction so that the dogging member 33 will engage the shoulder 34. A spring 36 is wound about the rivet 18, and the lower end of this spring acts against the web 31 of the handle 11 while the upper end of the spring acts against the part 35 of the locking member 32 to normally urge the locking member to its inoperative position or the position shown in Fig. 1.

When the parts are in closed position, as shown in Fig. 3, the spring 30 being relatively strong will tend to urge the handles apart, but the engagement of the shoulder 34 with the locking dog 33 will hold the locking member 32 in its locking position notwithstanding the action of the spring 36 tending to move the dog 33 outwardly.

It will be noted that in Fig. 3 the handles 10 and 11 are in slightly spaced position, and when they are pressed together by the operator the dog 33 will be released from engagement with the shoulder 34 and will be automatically moved outwardly to the position shown in Fig. 1 by the spring 36.

As will be understood, the fingers of the operator will normally be gripped around the handle member 10 with the handle 11 being gripped between the thumb and fingers. In order to prevent the fingers slipping from the handle 10, this member is shaped to provide a grip, as shown at 38, this grip lying between projections 39 and 40 at the upper end of the handle member. This grip portion will normally receive the forefinger of the operator and prevent the fingers from slipping downwardly upon the tool during operation. Any convenient means may be provided to limit the closing movement of the jaws such as means, for example, to limit the approach of the handle members one to the other. In the present instance this limiting function is obtained by contact of the portion 41 of the handle 10 with the portion 42 of the handle 11 although other equivalent limiting means may be provided.

While I have shown and described a preferred embodiment of my invention, it will be understood that it is not to be limited to all of the details shown, but is capable of modification and variation within the spirit of the invention and within the scope of the claims.

What I claim is:

1. In a pruning implement, a pair of pivoted, cooperating shearing members, a handle carrying each of said members, one of said shearing members comprising a cutter head having a shoulder adjacent the pivot of the shearing members, one of said handle members being hollow, a locking member of U-shaped form pivoted within said handle and having a locking dog spaced from the pivot point to engage said shoulder and hold the shearing members in closed position, and a spring urging said locking member to an inoperative position in which it is not engaged with said shoulder, said locking member also having a web portion extending through an opening in the handle for manual engagement, said web portion lying between the locking dog and said pivot, and being freely movable through said opening, and said spring bearing against the web portion.

2. A pruning implement comprising a pair of pivoted, cooperating shearing members, a handle member rigid with each of said shearing members, one of said shearing members being provided with a locking shoulder, one of said handle members having spaced outer walls and a locking member pivoted at one end thereof between said walls, said locking member having a locking dog at its other end to engage said shoulder to hold the shearing members in closed position, and a part intermediate its ends projecting from the walls of the handle member for manual engagement and said part being closer to the pivot than is said dog.

References Cited in the file of this patent

UNITED STATES PATENTS

| Number | Name | Date |
|---|---|---|
| 154,637 | Breeden | Sept. 1, 1874 |
| 1,086,286 | Fyhrie | Feb. 3, 1914 |
| 1,104,768 | Bernard | July 28, 1914 |
| 1,280,555 | Saumweber | Oct. 1, 1918 |
| 2,093,987 | Wallace | Sept. 21, 1937 |
| 2,189,211 | Lind | Feb. 6, 1940 |